Figure 9:
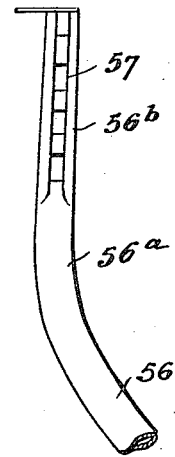

G. B. KEPLINGER.
BOTTLE WASHING MACHINE.
APPLICATION FILED APR. 12, 1912.
1,124,457.
Patented Jan. 12, 1915.
10 SHEETS—SHEET 1.
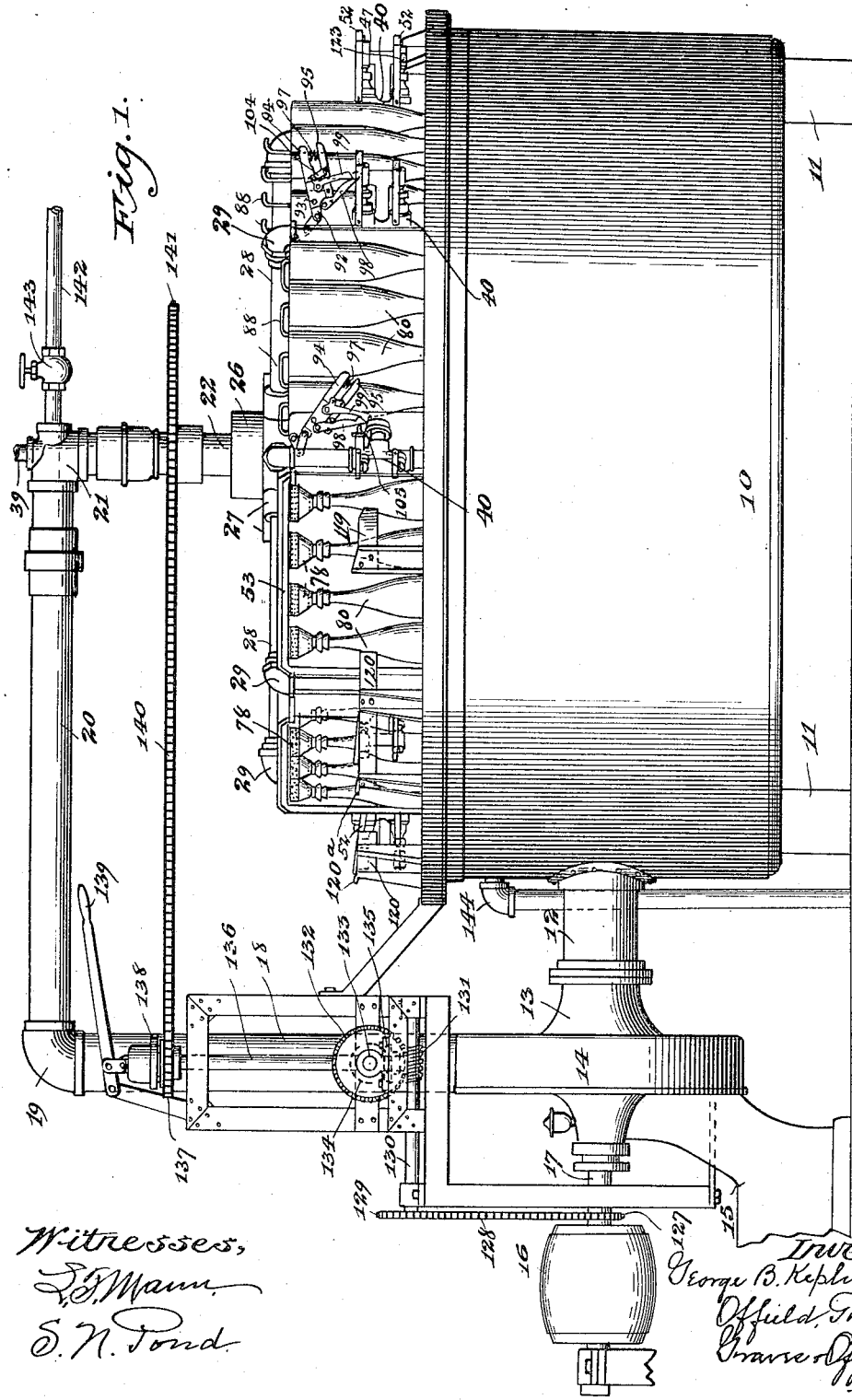

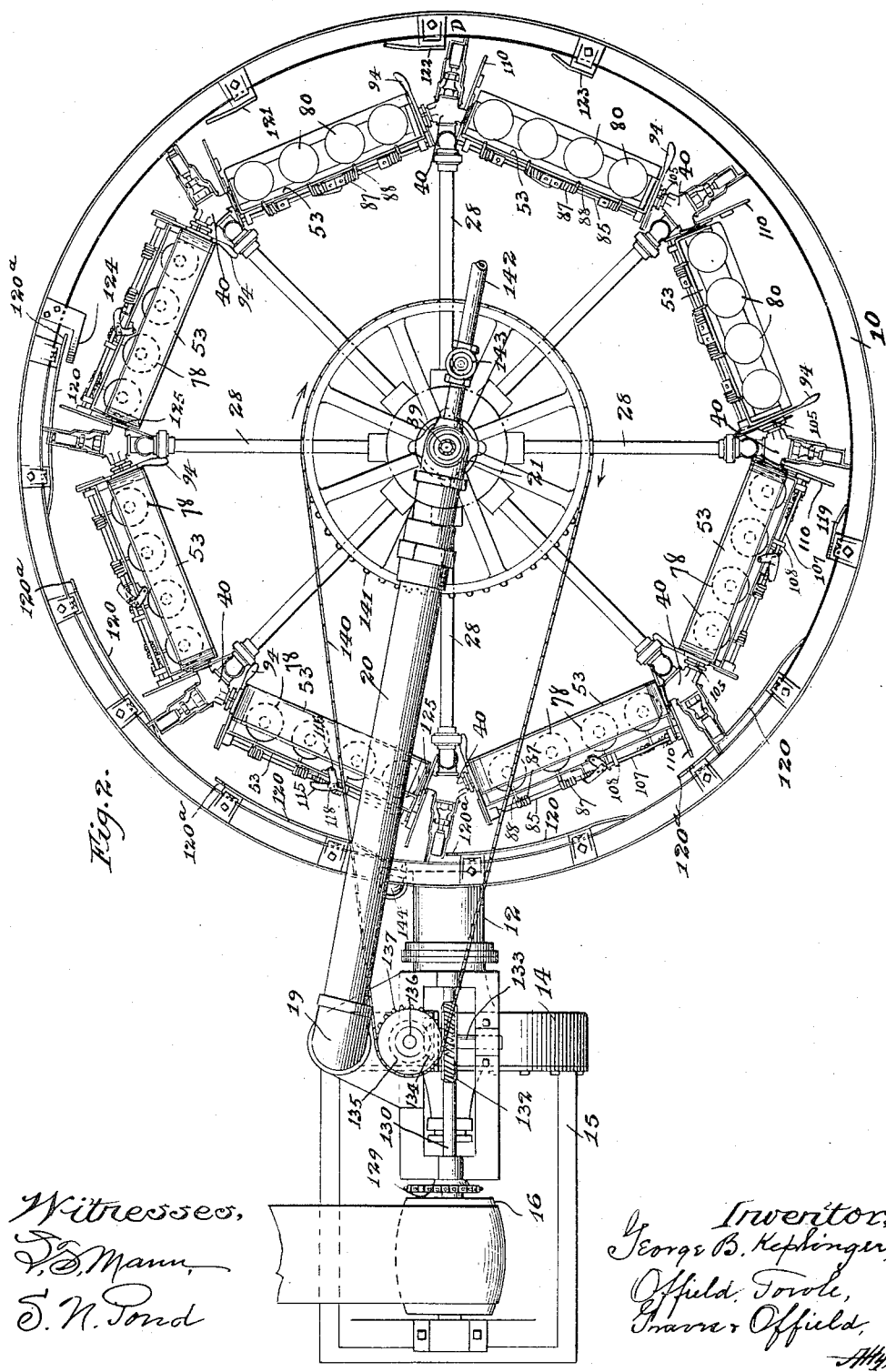

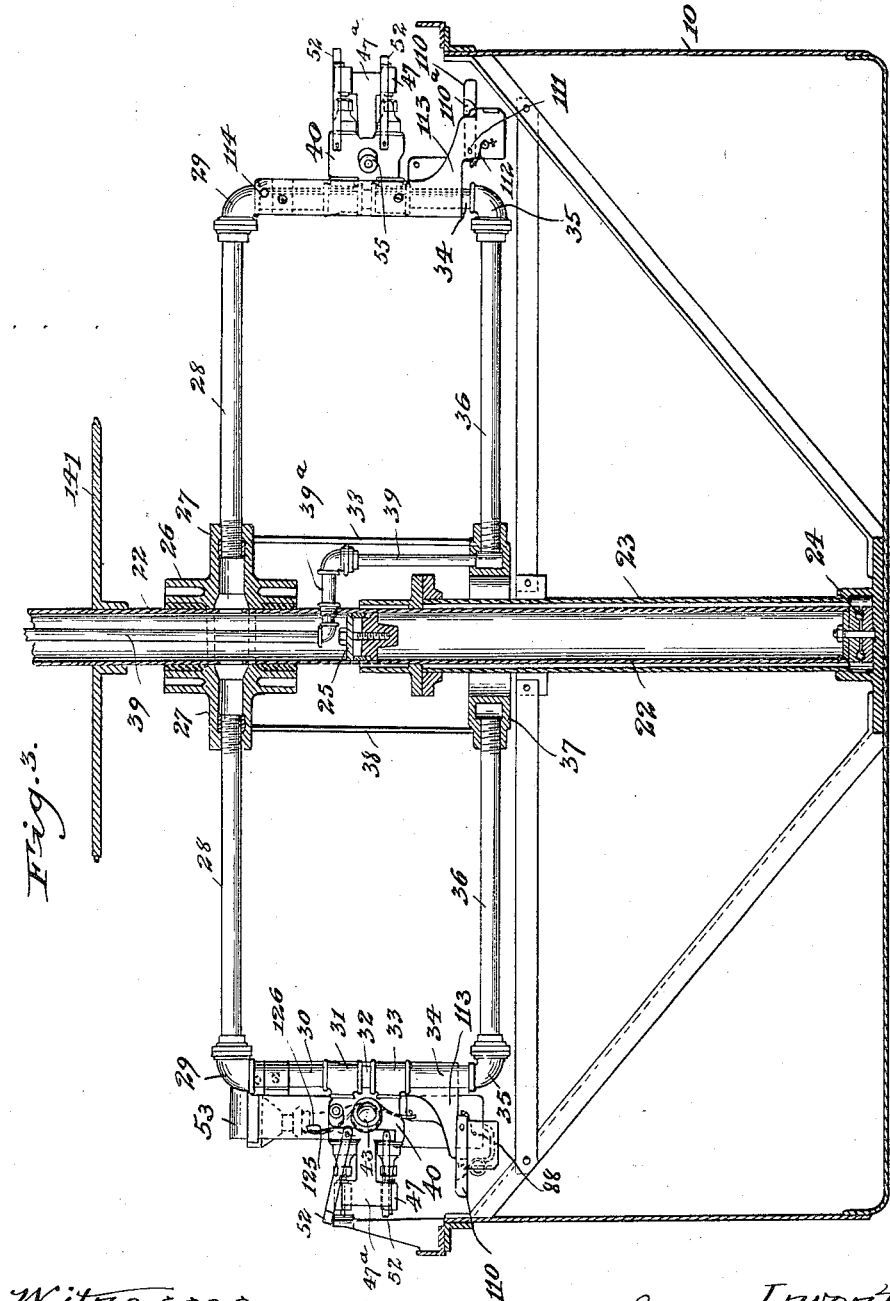

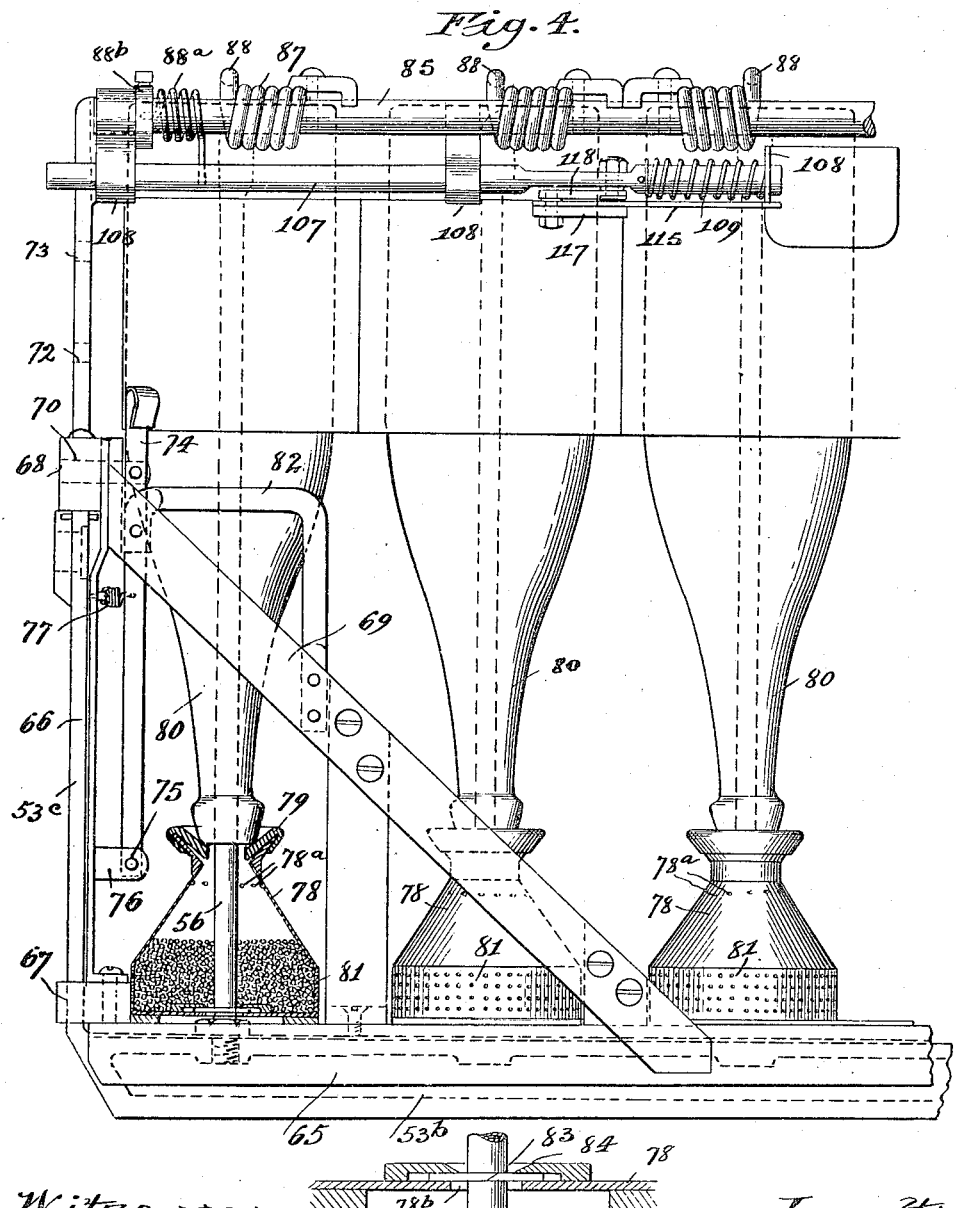

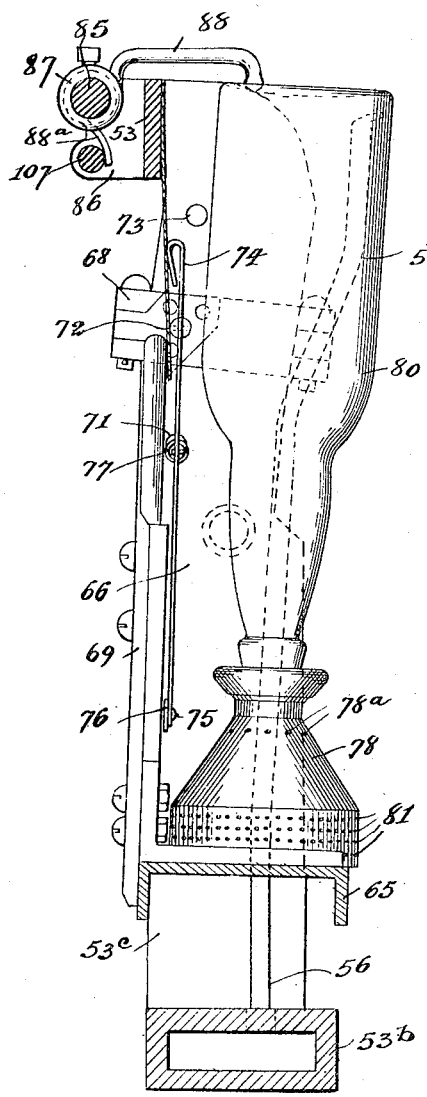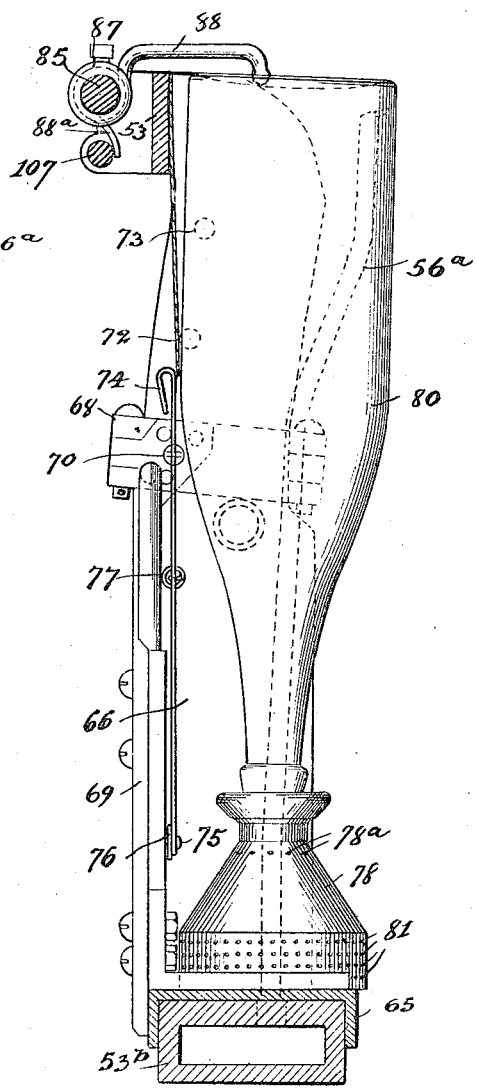

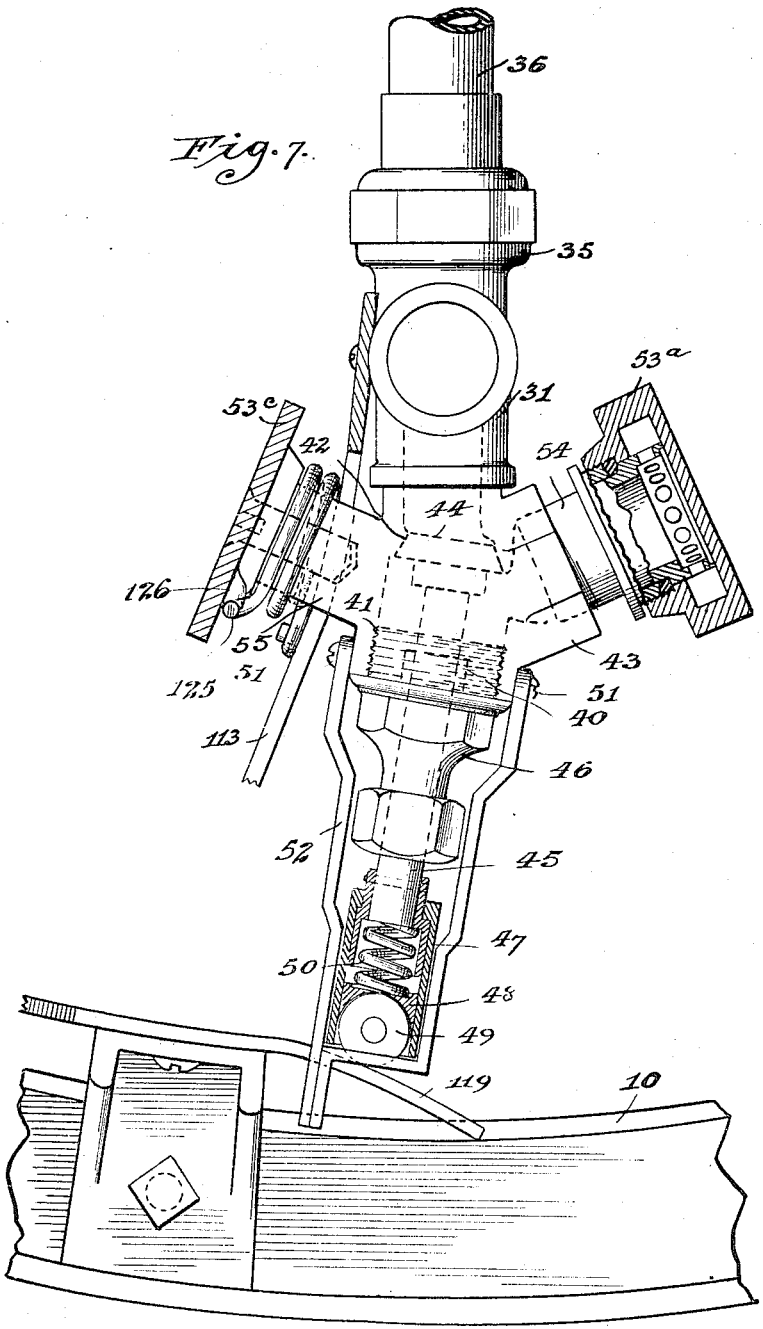

G. B. KEPLINGER.
BOTTLE WASHING MACHINE.
APPLICATION FILED APR. 12, 1912.

1,124,457.

Patented Jan. 12, 1915.
10 SHEETS—SHEET 7.

Witnesses:
L. S. Mann
S. N. Pond

Inventor:
George B. Keplinger,
By Offield, Towle, Graves & Offield,
Atty's.

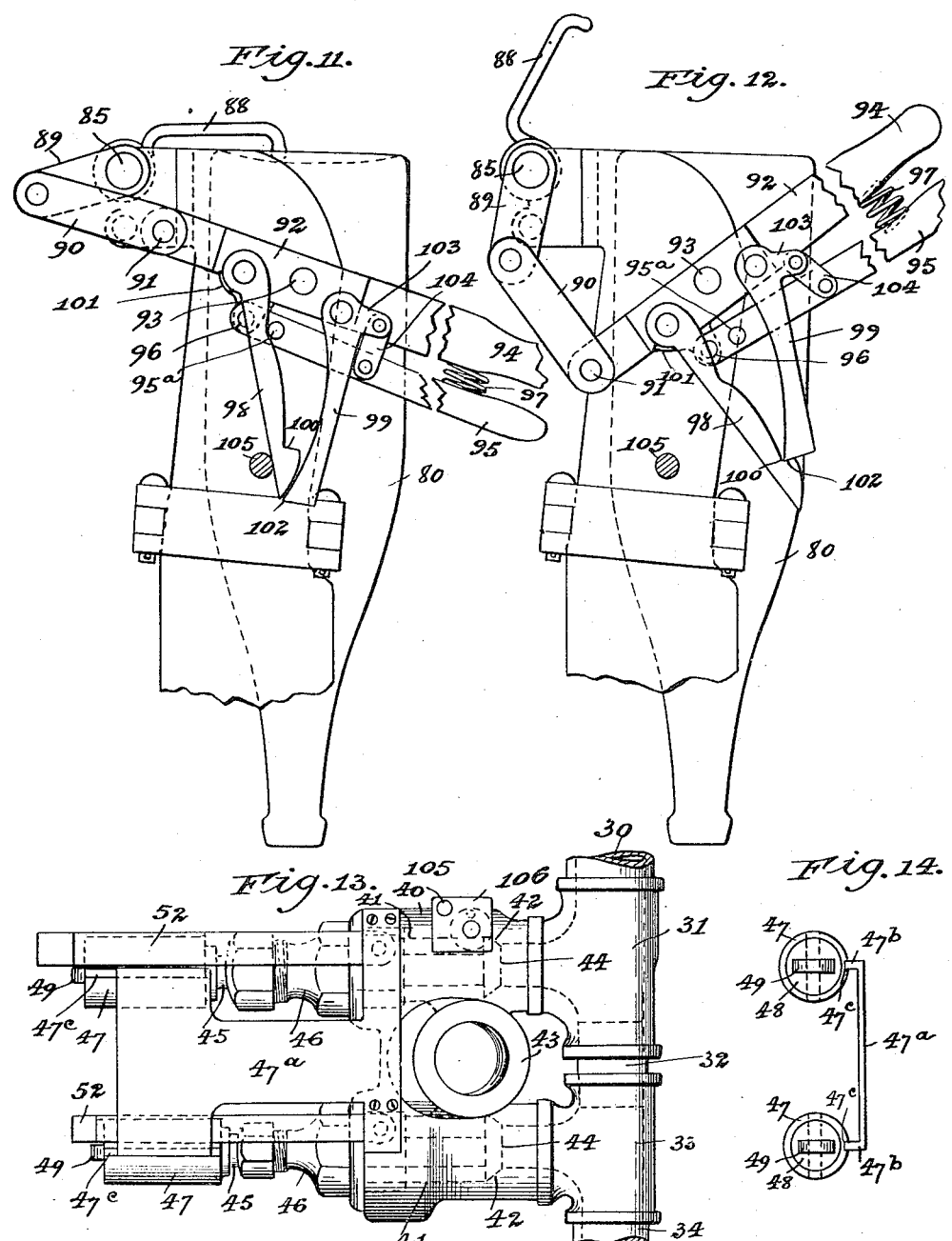

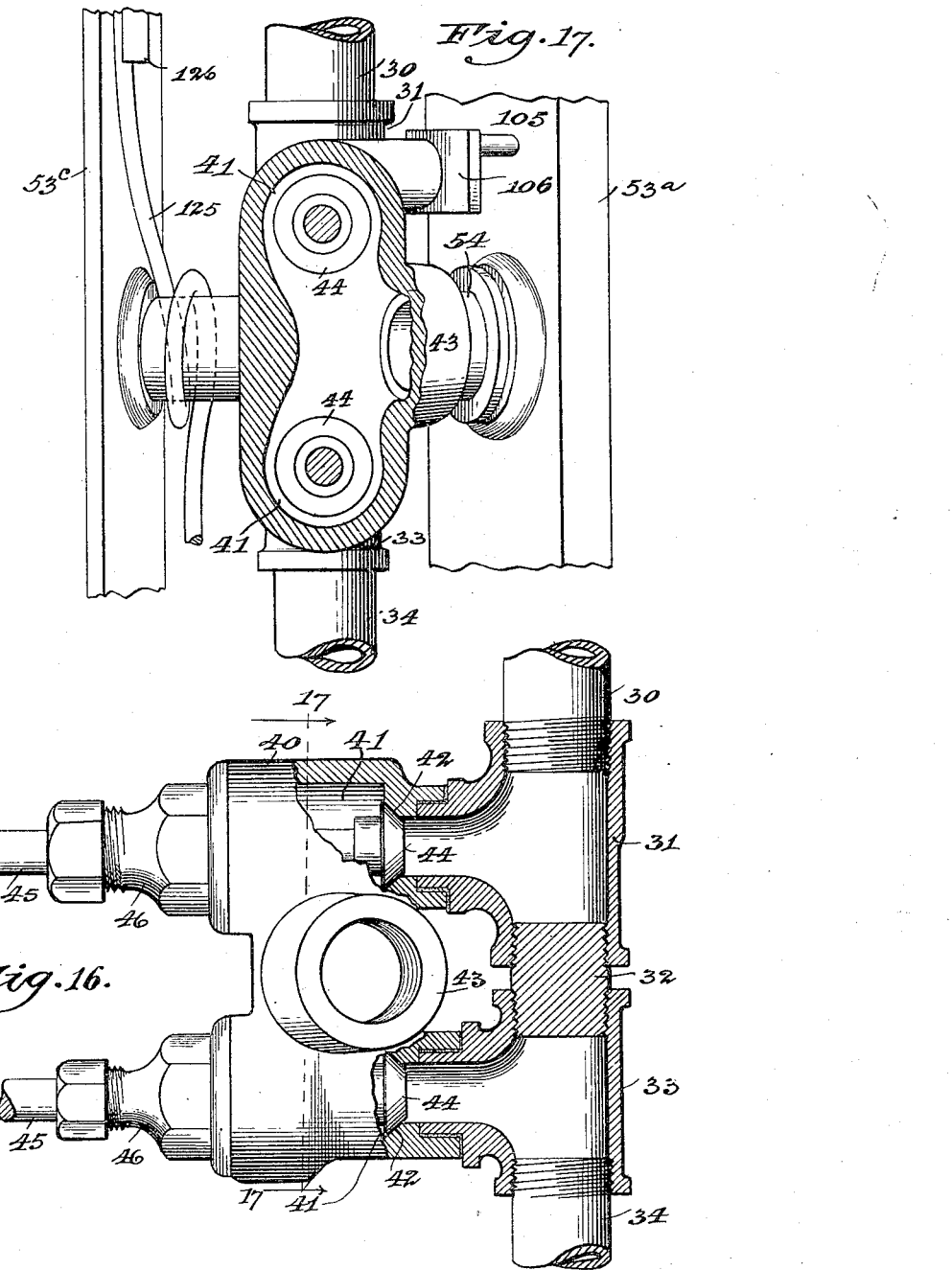

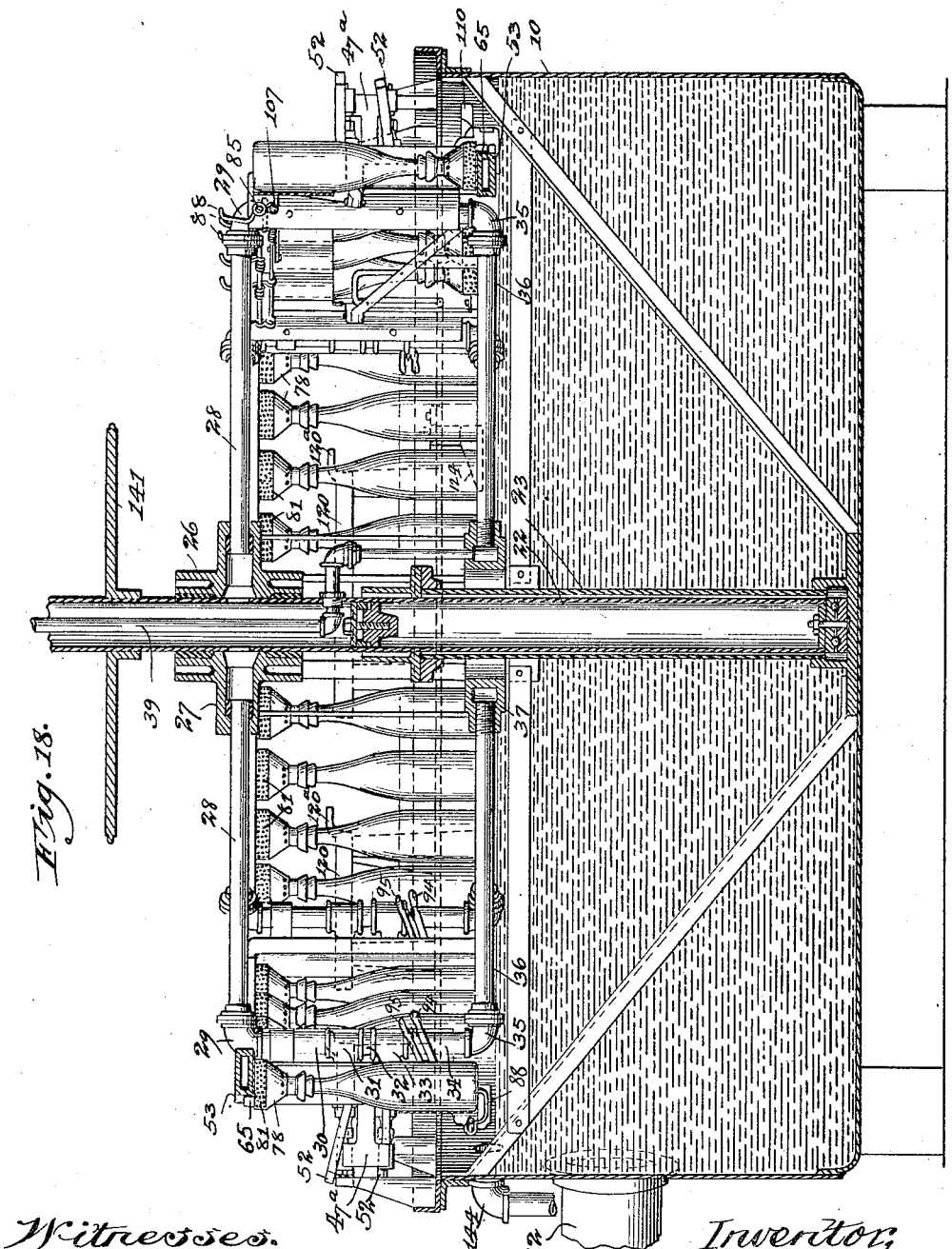

UNITED STATES PATENT OFFICE.

GEORGE B. KEPLINGER, OF CHICAGO, ILLINOIS, ASSIGNOR TO KYLE BOTTLE WASHING MACHINE COMPANY, OF CHICAGO, ILLINOIS, A CORPORATION OF ILLINOIS.

BOTTLE-WASHING MACHINE.

1,124,457.  Specification of Letters Patent.  Patented Jan. 12, 1915.

Application filed April 12, 1912. Serial No. 690,279.

*To all whom it may concern:*

Be it known that I, GEORGE B. KEPLINGER, a citizen of the United States, residing at Chicago, in the county of Cook and State of Illinois, have invented certain new and useful Improvements in Bottle-Washing Machines, of which the following is a specification.

This invention relates to bottle washing machines such as are used by manufacturers of bottled goods to effect the thorough washing and cleansing of new or used bottles.

My present invention relates, more specifically, to that type of bottle washing machines wherein the bottles are carried on a rotary frame that is mounted on a vertical axis, and the frame members of which are hollow to admit the washing solution from a main supply pipe connected to the center of the frame, whence the solution passes through radially disposed hollow arms or spokes to a series of bottle holders that are grouped around the peripheral portion of the main frame.

In the preferred form of the invention herein disclosed, the bottle holders consist of bottle-carrying frames that are pivotally mounted on the main rotary frame so as to be capable of being inverted at a point in the rotation of the main frame at which the washing and scouring action is complete, for the purpose of allowing the washing solution to run out and a rinsing liquid to be introduced and to operate upon the interior of the bottles during the remainder of a single complete rotation of the main frame. The pipes which conduct both the washing and rinsing liquids to the bottles are provided with suitable valves, which are opened and closed in properly timed order and relation by suitably placed cam devices coöperating with the stems of the valves.

An important feature of my present invention resides in the means employed for effecting the mechanical scraping and scouring of the internal walls of the bottles by the effect of scouring shot, and in the means employed for controlling the movement and action of the washing solution and scouring agent to secure a thorough scouring effect.

Bottle washing machines, with the exception of those of the brush type, quite commonly employ a scouring agent in the form of ordinary round shot, sand, or like material, which is simply thrown back and forth into and out of the bottles along with the washing fluid. This, however, is not effective to secure a scouring action upon the bottles; and I have discovered that, in order to secure this scouring action through the agency of the shot, the washing liquid must be introduced under such pressure and in such a manner as to throw the scouring agent violently by centrifugal action against and in scraping contact with the inner walls of the bottles throughout the entire extent of the latter; and in the machine of my present invention I have devised and provided an efficient mechanism for this purpose.

My invention, its principle and mode of operation, and the benefits and advantages attained thereby, will all be readily understood when considered in connection with the accompanying drawings illustrating one practical form in which the invention may be embodied, and a form which, by actual demonstration, I have found to give satisfactory results in effecting a thorough cleaning of soiled bottles.

Figure 10:
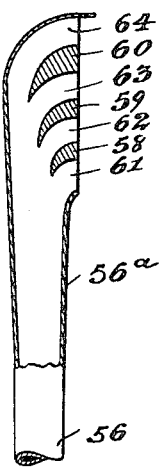
Figure 8:
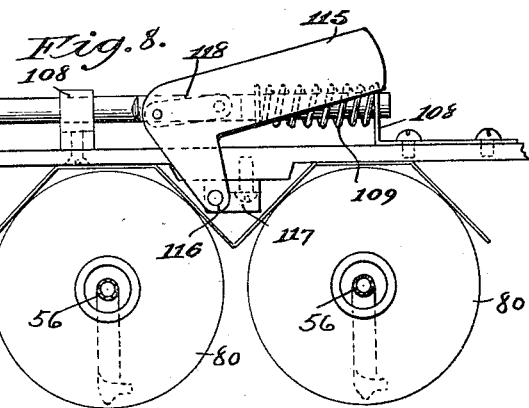

In the drawings, Figure 1 is a side elevational view of the complete machine. Fig. 2 is a top plan view of the same. Fig. 3 is a vertical axial section, with parts omitted for the sake of clearness. Fig. 4 is an enlarged detail elevation of a portion of one of the pivoted bottle carrying frames, showing the means for clamping the bottles in place and for adjusting the bottle holders to bottles of different sizes, such as quarts, pints and splits. Figs. 5 and 6 are detail sectional views through the bottle-carrying frame shown in Fig. 4 at right-angles to the plane of the latter, Fig. 5 showing the adjustment to accommodate pint bottles and Fig. 6 the adjustment to accommodate quart bottles. Fig. 7 is an enlarged detail top plan view, partly in horizontal section, illustrating the automatic means for controlling the flow of washing fluid to the bottle-carrying frames. Fig. 8 is a detail plan view of an automatically controlled lock and releasing mechanism therefor which secures the pivoted bottle-carrying frame in either of the two vertical position which it occupies in the washing and rinsing operations, respectively. Fig. 9 is a detail view in edge elevation of the water-injecting tube or nozzle that enters the bottle. Fig. 10 is an elevation, partly in longitudinal section, of the device shown in Fig. 9 in a plane at right-angles to that of the latter figure. Fig. 11 is an enlarged detail view in side elevation of the bottle clamp and clamp-actuating mechanism, showing the relative positions of the parts when the clamp engages the bottle. Fig. 12 is a view similar to Fig. 11, but showing the relative position of the parts when the clamp is released or disengaged from the bottle. Fig. 13 is an enlarged detail view, showing in side elevation one of the valve casings and the valves that control the flow of the washing fluid and rinsing water to the bottle-carrying frames. Fig. 14 is a view from the left-hand end of Fig. 13, with parts omitted, and showing the key for maintaining the valve stems against turning movement on their axes. Fig. 15 is an enlarged sectional detail through the bottom of one of the shot-boxes and the base member of the inner adjustable shot-box supporting frame, showing a closure for preventing the escape of shot around the injection nozzle when the inner frame is adjusted to different positions to accommodate different sized bottles. Fig. 16 is an enlarged detail view of the parts shown in Fig. 13, but broken out and partially in vertical section to show the separation of the couplings admitting washing fluid and rinsing water, respectively. Fig. 17 is a vertical section on the line 17—17 of Fig. 16, viewed in the direction indicated by the arrows. Fig. 18 is a central vertical section through the entire machine, showing the bottle-holding frames in their two positions.

Referring to the drawings, 10 designates a washing-tank, herein shown as circular in form and adapted to be supported on the floor as by legs 11. A pipe 12 taps the tank laterally about mid-height of the latter and is connected to the suction side 13 of a rotary force pump 14 herein shown as mounted upon a suitable base 15 and driven by a belt pulley 16 on the shaft 17 of the pump piston. The delivery side of the pump communicates with a vertical pipe 18 that connects at its upper end by an elbow coupling 19 with a horizontal pipe section 20 extending over the tank 10 and communicating through a coupling 21 with a central vertical tube or pipe 22 that is coaxial with the tank 10 and extends down to substantially the bottom of the latter, as clearly shown in Fig. 3. The lower portion of the tube 22, which extends through the tank 10, is surrounded by a sleeve or casing 23 and, at its lower end, is supported by an anti-friction step-bearing 24 so as to be readily revoluble on its own axis. The tube or hollow shaft 22 is closed at a point slightly above the top of the tank 10 by a water-tight partition 25; and secured to that portion of the shaft 22 above the partition 25 is a hub member 26 having a series of radially extending bosses 27, into the ends of which are fitted watertight a corresponding series of radially extending hollow spokes 28. These spokes 28 communicate, through elbow couplings 29, with vertical pipe sections 30, the lower ends of which are fitted into T-couplings 31. The lower ends of the couplings 31 are closed by plugs 32, the lower ends of which latter enter and close the upper ends of other T-couplings 33, which latter are connected to and communicate with lower vertical pipe sections 34, these latter, in turn, communicating, through elbow couplings 35, with a corresponding series of lower radially extending pipes or hollow spokes 36 that form a water-tight joint with a hollow ring 37 encircling the tube 22 and casing 23, and conveniently supported by suspension rods 38 from the hub 26. The hollow ring 37 is tapped by a pipe 39 that enters the coupling 21 from a convenient source of fresh rinsing water, said pipe 39, for a portion of its vertical length, extending through and coaxial with the shaft 22, as clearly shown in Fig. 3, and, above the partition 25, having a horizontal off-set 39ª extending through the wall of the tube 22.

Connected to each pair of T-couplings 31 and 33 is a cored valve casing 40, formed with duplicate horizontal bores 41 (Figs. 16 and 17), each containing a valve seat 42; and both of said bores communicating, beyond the valve seat, with the bore of a laterally extending hollow boss 43. The valve seats 42 are controlled by valves 44, the stems 45 of which extend through glands 46, and at their outer ends have slidably connected thereto boxes 47, each containing a block 48 (Figs. 7 and 14) preferably carrying a horizontal roller 49, and backed by a stiff compression spring 50 that abuts against the end of the valve stem 45. Pivoted to the valve casing 40 at 51 is a locking bail 52, the closed end of which normally overlies the outer end of the box 47 and block 48; and, when the valve is in closed position, also engages the roller 49, thereby locking the valve 44 closed. Both radially extending arms of each hollow valve-casing are equipped with valve mechanism similar to that last described, as shown in Fig. 13. As it is essential, where antifriction rollers 49 are employed at the ends of the valve stems, to maintain said rollers in a horizontal position, I provide the means shown in Figs. 13 and 14 for preventing turning movement of the valve stems on their individual axes, this means comprising a plate 47ª rigidly secured to one side of the valve casing and lying alongside the two valve stems, the upper and lower edges of said plate being formed with keys 47ᵇ that slidably engage key-ways 47ᶜ formed in and longitudinally of the boxes 47. In the intermediate hollow boss or trunnion 43 is pivotally mounted a bottle-carrying frame designated as an entirety by 53. One vertical side member 53ª and one horizontal member 53ᵇ of said frame are hollow, the vertical side member 53ª having a hollow, journal 54 (Fig. 7) that is mounted water-tight in the hollow boss 43 of the valve casing 40. The opposite vertical side member 53ᶜ of the bottle-carrying frame 53 is journaled upon a boss 55 on the opposite side of the valve casing 40; the bottle-carrying frames being thus journaled on horizontal axes that are slightly off center, so that each tray, when loaded with bottles, normally tends to swing on its trunnions to a position in which the bottles are inverted or bottom up.

Mounted on and communicating with each of the hollow frame members 53ᵇ (Figs. 4, 5, and 6) are a series of water injection nozzles 56, corresponding in number to the number of bottles to be accommodated by each frame. Each of these nozzles, when engaged with a bottle, extends approximately to the bottom of the bottle, as clearly shown by dotted lines in Figs. 5 and 6, and is off-set laterally toward its free end, as shown at 56ª. The detail views, Figs. 9 and 10, illustrate the formation of the off-set water-discharging portions of these nozzles. It will be observed from these figures that the nozzles are somewhat flattened at their free ends, as shown at 56ᵇ, and are provided with an edge opening 57. The flattened portion of the nozzle is also widened toward its outer end, as shown in Fig. 10, and in the lateral delivery mouth of this widened portion are set a series of curved deflector plates 58, 59 and 60, dividing the delivery mouth into four delivery ports or mouths 61, 62, 63, and 64. The deflector plates 58, 59, and 60 are of increasing lengths outwardly of the nozzle, as shown, so that the stream of water passing through the nozzle is divided into approximately four equal jets, and issues in such form through the entire length of the lateral delivery mouth of the nozzle. The delivery mouth of the nozzle is so positioned as to direct the relatively wide jet of water with great force against the inner wall of the bottle in a direction oblique to the wall of the bottle and as nearly tangential to the point or line of impingement as is possible, so as to secure the maximum scouring or scrubbing effect, and, at the same time cause the body of water in the bottle to undergo an exceedingly rapid whirling motion, thereby taking advantage of the very considerable centrifugal force, as an aid in the scouring and cleansing operation, which the water, thus introduced, presents.

Within each of the pivoted bottle-carrying frames is adjustably mounted a smaller frame comprising a channel-bar 65 (Figs. 4, 5, and 6) parallel with the hollow frame bar 53ᵇ, and side members 66 carrying crossheads 67 and 68 slidably engaging the vertical side members of the main bottle-carrying frame. The frame members 65 and 66 are rigidly connected by an oblique brace 69, and slidably mounted in the upper portion of the member 66 and upper cross-head 68 is a locking pin 70 adapted to take into any one of a series of holes 71, 72, and 73 formed in the side frame member 53ᶜ of the outer frame. The inner end of the pin 70 is pivotally attached to a thumb lever 74, this latter being pivoted at its lower end at 75 to a lug 76 on the frame member 66, and normally drawn into locking position by a spring 77. Mounted on the horizontal frame bar 65 are a series of cone-shaped shot-boxes 78 formed on their upper ends with mouths 79 adapted to receive the open ends of the necks of the bottles 80. The shot-boxes 78 are, of course, disposed coaxially with the injection nozzles 56; and their side walls at their widest or base portions are provided with a large number of minute perforations, as shown at 81 (Fig. 4), to allow of the free outflow of water, but sufficiently small to retain the shot. The shot-boxes are further provided, just below their necks, with a row of perforations 78ª that serve to admit air to facilitate the outflow of the washing solution and the rinsing water. Attached to the brace bar 69 is a handle 82 by which the inner adjustable frame can be conveniently set within the outer or main frame to a position to accommodate different sizes of bottles, as quarts, pints, and splits. Fig. 6 shows the adjustment for a quart bottle and Fig. 5 the adjustment for a pint bottle.

On the base bar 65 of the inner slidable frame is a construction designed to adapt the nozzles and shot-boxes to the varying sizes of bottles and prevent the loss of shot. It will be noted by reference to Figs. 5 and 6 that the nozzles 56 have a slight outward inclination throughout the greater part of their length to compensate for the smaller diameter of the smaller sized bottles and bring the offset discharging end 56ª of the nozzle in substantially the same relation to the walls of the different sized bottles. By reference to the detail view Fig. 15, it will be seen that the opening 78ᵇ in the bottom wall of the shot-box through which the nozzle 56 passes is of sufficiently larger diameter than the nozzle itself to accommodate the vertical movement of the shot-box to the slightly inclined position of the nozzle; and surrounding and snugly fitting the nozzle is a washer 83 that is confined by an overhanging annular lip 84 on the bottom wall of the shot-box. As the latter is slid upwardly over the nozzle 56, the washer 83 and lip 84 coöperate to effectively close the opening 78^b in the bottom of the shot-box against loss of shot therethrough.

At the opposite end of the frame from that occupied by the shot-boxes is mounted a mechanism for clamping the bottles in place through spring pressure applied to their bases or bottom ends. This clamping mechanism is best shown in Figs. 4, 5, and 6, and comprises a rod 85 journaled in ears 86 on the frame and having anchored to and coiled thereon a series of springs 87, one for each bottle, each of said springs at one end terminating in an overhanging spring arm 88 adapted to engage the bottom of the bottle in the manner clearly shown in Figs. 5 and 6 when the rod 85 is rocked to clamping position. The actuation of the clamps is effected through a handle mechanism shown mainly in Figs. 11 and 12. Fast on one end of the rod 85 is a crank arm 89, the free end of which is connected by a link 90 and pivotal joint 91 to the inner end of a handle lever 92 that is pivoted at 93 to one of the side members of the pivoted bottle-carrying frame. This lever 92 has a handle 94 and a grip-latch 95 beneath the same. The grip-latch 95 is pivoted at 96 to a lug on the under side of the handle, and normally forced from the handle by a spring 97. The relation of the pivots of the crank arm 89, link 90, and lever 92, is such that when the hand lever is forced down to its lowermost position, as shown in Fig. 11, the pivot 91 is slightly above a straight line connecting the pivot 93 and the pivotal connection of link 90 to crank arm 89, so that the device is self-locking in the closed or operative position of the clamps.

Pivoted to and depending from the handle lever 92 are a pair of latches 98 and 99. The latch 98 has a straight inner or rear edge, and, on its forward or outer edge a notch 100, and said latch is limited as to its inward swinging movement by a stop 101. The coöperating latch 99 has a pointed end 102 that is adapted, when the joint 91 is broken and the clamps released, to engage the notch 100 of the latch 98 in the manner shown in Fig. 12. The latch 99 has a short laterally extending arm 103 that is connected by a short link 104 to the grip-latch 95; so that when the clamping mechanism is actuated to apply the clamps to the bottles, the point 102 of the latch 99 is swung away from the notch 100 of the latch 98, and the application of the clamps leaves the two latch members 98 and 99 in the relative positions shown in Fig. 11. This is due to the fact that, in the applied position of the clamps, the straight back of the latch 98 abuts against a pin 105 on a plate 106 carried by the valve casing 40. As soon as the upper end of the pivoted bottle-carrying frame is swung forwardly or toward the operator, the latch 98 leaves the pin 105, and the spring 97, through grip lever 95, link 104, and arm 103, swings the latch 99 to a coöperating position with the notch 100, such as is shown in Fig. 12; although, in the situation referred to, the clamps are applied and the joint 91 is not broken. When the frame is inverted between the washing and rinsing operations, the straight rear edge of the latch 98 strikes the pin 105, and thereby swings the handle lever 94 to the open position shown in Fig. 12, thus releasing the clamps; the latter being thrown back by a spring 88^a coiled around the rod 85 and secured at one end to a collar 88^b keyed to said rod, the other end of said spring bearing against a locking bar 107 hereinafter referred to. When the clamp mechanism is to be applied, from the idle position shown in Fig. 12, the raising of the grip lever 95 disengages the point 102 of the latch 99 from the notch 100 of the latch 98, and allows the mechanism to close with the parts in the relative positions shown in Fig. 11. A pin 95^a projecting laterally of the grip lever 95 engages the outer edge of the latch 98 when the clamp is in applied position (Fig. 11) and coöperates with the pin 105 to limit the downward swing of the hand lever 94 and prevent the breaking upwardly of the joint 91. It will thus be seen that I provide an automatic clamp-operating mechanism in combination with a swinging bottle-carrying frame, which automatically releases the bottles when the frame is swung to a position in which the bottoms of the bottles are uppermost.

The swinging bottle-carrying frame is locked in either upright position by means of a locking bolt 107 (Figs. 4 and 8) that is slidably mounted in guide lugs 108 secured to one of the horizontal frame members; said locking bolt being normally urged to locking position by a spring 109 connected to the bolt at one end and at its opposite end abutting against one of the bearing lugs 108. The outer end of the bolt 107, as the frame is swung, passes beneath a keeper 110^a (Figs. 3 and 8) fast on a latch 110, which latter is pivoted at 111 to a stationary plate 113 that is attached to the pipe sections 30 and 34. The latch 110 is normally urged downwardly by a spring 112 engaging the heel of the latch with a lifting effect. In the reverse position of the bottle-carrying frame the latter is locked through the engagement of the bolt 107 with a hole 114 (Fig. 3) in the upper end of plate 113, said plate 113 on the approach side of the hole 114 being inclined to effect a cam engagement with the end of the locking bolt. The locking bolt is manually retracted from the hole 114 by an elbow lever 115 (Figs. 4 and 8) that is pivoted at 116 to a bracket 117 on the frame and is connected to the bolt 107 by a link 118.

The washing operation takes place with the bottles in upright position, and while the bottles and their carrying frames are traveling throughout substantially the left-hand half of the washing tank shown in Figs. 1 and 2. The centrifugal whirling and spiral movement and force of the water within the bottles are so great, when the water enters under a proper pressure to effect a thorough scouring, that the shot are rapidly whirled by a spiral movement up along the sides and through the necks and mouths of the bottles into the shot boxes, where they would mainly remain, were not provision made for permitting them to drop into the bottles again. The up-and-down movement of the shot through the bottles during the washing operation is effected by alternately admitting and cutting off the water to the nozzles during the travel of the bottle-carrying frames throughout the washing region of the total travel; the sudden cutting off of the water pressure causing the shot to rapidly drop to the bottoms of the bottles, and the reintroduction of the water, under pressure, renewing their upward whirling and scouring action. To effect this alternate admission and cutting off of the water I provide, on the rim of the tank 10, suitable cam devices for raising the locking latches 52 and for closing the valves 44.

Referring to Fig. 2, 119, 120, 121, 122 and 123 designate a series of valve and valve latch controlling cams grouped about the upper edge of the washing tank; the several cams 120 being alike in structure and function, and the remaining cams having varying functions as hereinafter explained. The cam 119 represents the starting point, and, as the large spider frame slowly rotates, the stem of the valve which admits the washing solution to the bottle-carrying frame controlled thereby engages the incline of the cam 119 (see Fig. 7) and compresses the spring 50, carrying the slidable spring-housing 47 inwardly sufficiently to release its outer end from the locking bail or latch 52. The upper edge of the cam 119 is inclined, as shown in Fig. 1, so that, by the time the valve stem has passed off the end of the cam, the valve latch 52 has been raised out of engagement with the valve stem, leaving the valve free to open under pressure of water behind the same, and thus admitting the washing solution to the bottle-carrying frame and nozzles. It will be noted that the vertical face of the cam presses the end of the valve stem inwardly out of engagement with the latch before the latter is raised by the inclined rear portion of the upper edge of the cam, thus avoiding wear upon both the valve stem and latch. While the valve stem is traveling from the cam 119 to the first cam 120 (the bottles being upright in the frame), the admitted water acts to thoroughly fill and flush both the shot boxes and the bottles. The engagement of the valve stem with the first cam 120 closes the valve and shuts off the water. During the travel of the valve stem over the first cam 120 the shot in the shot-boxes have ample time to fall to the bottoms of the bottles. This preliminary filling or flushing of the bottles is very essential to get the shot into the bottoms of the bottles, since the shot naturally tend to stick and cling to the walls of the shot-boxes and to the walls of the empty bottles, and it is only by flooding both with water that the shot can be dropped to the bottoms of the bottles, preliminary to the scouring operation. The several cams 120 have at their rear ends elevated extensions 120$^a$ (Figs. 1 and 2) on their upper edges, which hold the valve latch elevated until after the end of the valve stem passes off the rear end of the cam, allowing the valve to open. While the valve stem is traveling between adjacent cams 120, the washing solution is on, and the bottles are washed and scoured by the described spiral whirling action of the shot, and while the valve stems are passing over the several cams 120, the washing solution is cut off and the shot have time to sink again to the bottoms of the bottles. This alternate opening and closing of the valve controlling the washing solution takes place during the travel of each valve from the cam 119 around to the cam 121; it being understood that the cams 119, 120 and 121 control only the upper valves which admit the washing solution, and have no effect upon the lower valves that control the rinsing water, these latter being maintained closed by their respective latches throughout the travel of each bottle carrying frame past the cams 119, 120 and 121. The cam 121 has a relatively low upper edge which permits the locking latch of the valve stem to fall behind the latter as the valve stem engages the cam. Consequently, as each washing solution valve passes over the cam 121 it is locked in closed position, cutting off the supply of washing solution to the bottle-carrying frame and bottles controlled thereby. Simultaneously with this, the free end of the latch 110 at the opposite or rear side of the bottle-carrying frame so affected rides up on a stationary cam 124 (Fig. 2). This releases the detaining lug or keeper 110$^a$ of the latch from the end of the locking bolt 107, and leaves the pivoted frame free to swing to inverted position in which the bottoms of the bottles are uppermost. At this point the bottle carrying frame is given an initial push or start, sufficient to throw it out of its substantially balanced position, by means of a spring 125 (Figs. 3 and 7) that bears under tension against a lug 126 on the side of the swinging frame, the locking bolt 107 automatically snapping into the hole 114 and locking the frame in such inverted position. During the inversion of the bottle-carrying frame, the bottle clamps are automatically released by the engagement of the rear edge of latch 98 with the stationary pin or lug 105, in the manner heretofore explained. At this point the washing solution has been cut off, the bottle-carrying frames inverted with the bottoms of the bottles uppermost, and the clamps released. As the valves controlling the admission of water to the bottle-carrying frame travel from the cam 121 to the cam 122, the water in the inverted bottles and shot boxes drains out through the drain apertures of the shot-boxes, air being admitted through the air holes 78$^a$ at the necks of the shot-boxes. As the underlying valve controlling the supply of rinsing water passes onto the cam 122, the locking latch of said valve is raised off the end of the stem, and the rinsing valve opens, effecting the thorough rinsing of the bottles during the travel of the rinsing supply valve between the cams 122 and 123.

The cam 123 is a low cam, similar to the cam 121, and effects both the closing and locking of the rinsing supply valve by permitting the locking latch to fall over the end of the valve, as soon as the latter is forced by the cam to closed position. During the travel of the valves from the cam 123 to the cam 119 the washed and rinsed bottles are removed by the attendant, and soiled bottles are inserted in the frame, as shown at the right of cam 119 in Fig. 2, whereupon the operator first clamps them in place by depressing handle 94, then presses the hand lever 115, thereby releasing the locking bolt 107 from the hole 114, and then manually swings the frame to the reverse position in which the necks of the bottles are uppermost; these operations being easily performed during the slow rotation of the main frame, so that no interruption of the operation of the machine is required for the removal of clean bottles and the loading of soiled bottles.

The driving of the main frame may be effected by any suitable driving connections from a source of power; but in Figs. 1, 2, and 3 I have shown one practical form of such driving connections, consisting of a sprocket wheel 127 fast on the pulley shaft 17, a sprocket chain 128 driving a sprocket wheel 129 fast on a worm shaft 130, said shaft carrying a worm 131 engaging and driving a worm wheel 132 on a stub shaft 133, this latter carrying a bevel pinion 134 meshing with and driving a horizontal bevel pinion 135 on the lower end of a vertical shaft 136, on the upper end of which latter is loosely mounted a sprocket wheel 137 adapted to be made fast with the said shaft through a clutch 138 on the upper end of the shaft controlled by a clutch lever 139. The sprocket wheel 137 drives a sprocket chain 140 that, in turn, engages and drives a large sprocket wheel 141 fast on the main hollow shaft 22 of the machine.

In the operation of the machine hot water is preferably used containing soda in solution; this washing solution being preferably supplied under considerable pressure, since the greater the pressure of the water, the more efficient is the scouring effect of the shot upon the walls of the bottles owing to the greater centrifugal force of the whirling water and shot within the bottles. I may here state that, in practice, I have found that tin shot molded under great pressure in cubical form give the best results, owing to the sharp corners and edges presented thereby and the superior hardness of the material, as compared with lead. The particular form, kind or character of shot used, however, do not constitute any part of the present invention, and no claim thereto is made herein.

Bottle-washing machines are usually operated in intimate association with a soaking tank in which the soiled bottles are preliminarily soaked to get rid of labels as well as soften up and loosen the impurities adhering to their walls. In the operation of the present machine, it is evident that the rinsing water discharged from the bottles adds a constant increment to the body of liquid forming the washing solution, so that there is a constant overflow from the tank 10 in an amount substantially equal to the increment of the rinsing water. This surplus I preferably carry over to the soaking tank (not shown) through a pipe 142 leading from the coupling 21 to the soaking tank. This pipe 142 is equipped with a regulating valve 143 which will be so set as to gage the flow through the pipe 142 substantially to the inflow of rinsing water. To provide, however, against possible overflow at the rim of the tank 10 through improper setting of the valve 143, as well as to determine the maximum level of the water in the tank 10 where the machine may not be used with a soaking tank, and consequently may omit the pipe 142, I provide an overflow pipe 144 (Fig. 1), which may lead to any suitable drain.

The operation of the machine has been quite fully indicated in connection with the description of its construction. As stated, the operation is continuous, the main frame rotating slowly, and the several bottle-carrying frames successively engaging the several cams and going through the described operations.

The machine requires the services of but a single attendant to successively unload the clean bottles from the frames and successively reload the latter with soiled bottles and invert the reloaded frame to bring the bottles thereon into washing position. Where the washing water is used with a cleansing agent, such as soda, in solution, it is, of course, necessary, from time to time, to add a small amount of such cleansing agent to compensate for the dilution created by the addition of the fresh rinsing water.

It will be evident to those skilled in the art that variations and modifications in the detail features of the construction disclosed may be made without involving any change in the principle of the machine or sacrificing any of the advantages thereof. Hence, I do not limit the invention to the exact forms, arrangements and constructions disclosed except to the extent clearly indicated in specific claims.

I claim:

1. In a bottle-washing machine, the combination of a rotary main frame mounted on a vertical axis, a series of bottle-carrying frames mounted on and around the periphery of said main frame, shot boxes on said bottle-carrying frames provided with seats for the mouths of the bottles, injection nozzles extending through said shot boxes and adapted to enter the bottles, bottle-clamps, means for supplying a washing fluid under pressure, means for supplying rinsing water under pressure, valves controlling the admission of washing fluid to said injection nozzles, other valves controlling the admission of rinsing water to said injection nozzles, means for imparting a rotary movement to said main frame, means for automatically opening and closing said first-named valves alternately during a portion of the rotary movement of the main frame, and means for subsequently opening and closing said last-named valves automatically during another portion of the rotary movement of said main frame.

2. In a bottle-washing machine, the combination of a rotary main frame mounted on a vertical axis, a series of bottle-carrying frames pivotally supported on horizontal axes on and around the periphery of said main frame, shot boxes on said bottle-carrying frames provided with seats for the mouths of the bottles, injection nozzles extending through said shot boxes, and adapted to enter the bottles, bottle-clamps, means for supplying a washing fluid under pressure, means for supplying rinsing water under pressure, valves controlling the admission of washing fluid to said injection nozzles, other valves controlling the admission of rinsing water to said injection nozzles, means for imparting a rotary movement to said main frame, means for automatically opening and closing said first-named valves alternately during a portion of the rotary movement of the main frame to effect the scouring of the bottles, means for inverting the bottle-carrying frames at the conclusion of the scouring operation, and means for subsequently opening and closing said last-named valves automatically during another portion of the rotary movement of said main frame to effect the rinsing of the bottles.

3. In a bottle washing machine, the combination of a rotary main frame comprising a vertical tubular axial shaft, a series of tubular spokes communicating with and radiating from said shaft, a hollow ring surrounding said shaft, and a corresponding series of tubular spokes communicating with and radiating from said hollow ring, means for supplying a washing fluid to the upper end of said tubular axial shaft, means for supplying rinsing water to said hollow ring, cored valve casings connecting and communicating with the outer ends of coöperating spokes of the two series, two valves in each valve casing controlling communication between the latter and the respective spokes, a series of hollow bottle-carrying frames mounted on and between adjacent valve casings and each communicating with one of the latter, shot boxes on said bottle-carrying frames provided with seats for the mouths of the bottles, injection nozzles mounted on and communicating with the interior of said hollow frames and extending through said shot boxes and adapted to enter the bottles, bottle-clamps, means for rotating said main frame, means for alternately opening and closing one valve of each casing during a portion of the rotary movement of said main frame to control the admission of washing solution, and means for subsequently opening and closing the other valve of each casing during another portion of the rotary movement of said main frame to control the flow of rinsing water.

4. In a bottle-washing machine, the combination of a rotary main frame comprising a vertical tubular axial shaft, a series of tubular spokes communicating with and radiating from said shaft, a hollow ring surrounding said shaft, and a corresponding series of tubular spokes communicating with and radiating from said hollow ring, means for supplying a washing fluid to the upper end of said tubular axial shaft, means for supplying rinsing water to said hollow ring, cored valve-casings communicating with the outer ends of coöperating spokes of the two series, two valves in each casing controlling communication between the latter and the respective spokes, a series of hollow bottle-carrying frames pivotally supported on horizontal trunnions on and between adjacent valve-casings and each communicating through one of said trunnions with one of the valve-casings, shot-boxes on said bottle-carrying frames provided with seats for the mouths of the bottles, injection nozzles mounted on and communicating with the interior of said hollow frames and extending through said shot-boxes and adapted to enter the bottles, bottle-clamps, means for rotating said main frame, means for alternately opening and closing one valve of each casing during a portion of the rotary movement of said main frame to control the admission of washing solution, means for inverting the bottle-carrying frames at the conclusion of the scouring operation, and means for subsequently opening and closing the other valve of each casing during another portion of the rotary movement of said main frame to control the flow of rinsing water.

5. In a bottle washing machine, the combination of a rotary main frame comprising a vertical tubular axial shaft, a series of tubular spokes communicating with and radiating from said shaft, a hollow ring surrounding said shaft, and a corresponding series of tubular spokes communicating with and radiating from said hollow ring, means for supplying rinsing water to said hollow ring, cored valve-casings communicating with the outer ends of coöperating spokes of the two series, two valves in each casing controlling communication between the latter and the respective spokes, a series of hollow bottle-carrying frames pivotally supported on horizontal trunnions on and between adjacent valve-casings and each communicating through one of said trunnions with one of the valve-casings, shot-boxes on said bottle carrying frames provided with seats for the mouths of the bottles, injection nozzles mounted on and communicating with the interior of said hollow frames and extending through said shot-boxes and adapted to enter the bottles, bottle-clamps, a tank beneath and concentric with said main carrying frame, cams grouped around the periphery of said tank effecting the opening and controlling the closing movements of said valves, means for rotating said main frame, and a pump connected on its suction side to said tank and on its delivery side to said vertical shaft of said main frame.

6. In a bottle washing machine, the combination of a rotary main frame having a radially disposed water supply pipe, a hollow bottle-carrying frame carried by said main frame and communicating with said supply pipe, a valve controlling said communication and normally free to open under pressure of fluid in said supply pipe, said valve having a radially extending stem, a stationary cam located in the path of movement of the outer end of said valve stem adapted to engage the latter and force and hold said valve to closed position, and a locking latch automatically engaging said valve stem to hold said valve against opening when the latter has been forced to closed position.

7. In a bottle washing machine, the combination of a rotary main frame having a radially disposed water supply pipe, a hollow bottle carrying frame carried by said main frame and communicating with said supply pipe, a valve controlling said communication and normally free to open under pressure of fluid in said supply pipe, said valve having a radially extending stem, a stationary cam located in the path of movement of the outer end of said valve stem adapted to engage the latter and force and hold said valve to closed position, a locking latch automatically engaging said valve stem to hold said valve against opening when the latter has been forced to closed position, and a stationary cam located in the path of movement of said locking latch serving to move the latter out of locking position relatively to said valve stem to permit said valve to open.

8. In a bottle washing machine, the combination of a rotary main frame having a radially disposed water supply pipe, a hollow bottle-carrying frame carried by said main frame and communicating with said supply pipe, a valve controlling said communication and normally free to open under pressure of fluid in said supply pipe, said valve having a radially extending stem, a pivoted locking latch having a free outer end normally engaging over the outer end of said valve stem and holding said valve closed, a stationary cam located in the path of movement of the outer end of said valve stem adapted to engage the latter and force and hold said valve to closed position, and an auxiliary stationary cam formed on and extending rearwardly of said valve-closing cam adapted to engage the outer end of said locking latch and hold the same out of locking relation to said valve stem until the latter has passed off the end of said valve-closing cam.

9. In a bottle washing machine, a mechanism for supporting bottles of different lengths in position to be washed, comprising a substantially rectangular main frame carrying an injection nozzle adapted to enter the bottle, an inner frame slidably mounted on the side bars of said main frame and carrying a seat for the mouth of a bottle surrounding said injection nozzle, means for locking said inner frame in adjusted position relatively to said main frame and injection nozzle, and a clamping device carried by said main frame and adapted to engage the bottom of the bottle.

10. In a bottle washing machine, a mechanism for supporting bottles of different lengths in position to be washed and scoured, comprising a substantially rectangular main frame carrying an injection nozzle adapted to enter the bottle, an inner frame slidably mounted on the side bars of said main frame and carrying a shot-box surrounding said injection nozzle and formed with a seat for the mouth of a bottle, means for locking said inner frame in adjusted position relatively to said main frame and injection nozzle, and a clamping device carried by said main frame and adapted to engage the bottom of the bottle.

11. In a bottle washing machine, the combination of a pivoted invertible bottle-carrying frame, manually operable mechanism for clamping bottles therein, and means for automatically releasing said clamping mechanism during the inverting movement of said bottle-carrying frame.

12. In a bottle washing machine, the combination of a rotary main frame, an invertible bottle carrying frame pivotally supported on said main frame, manually operable mechanism for clamping bottles in said bottle carrying frame, means for automatically effecting the inversion of said bottle carrying frame during the movement of said main frame, and means for automatically releasing said clamping mechanism during the inverting movement of said bottle-carrying frame.

13. In a bottle-washing machine, the combination of a rotary main frame, an invertible bottle-carrying frame pivotally supported on said main frame, a spring normally tending to invert said bottle-carrying frame from washing position to draining position, a lock mechanism normally holding said bottle-carrying frame in washing position against the action of said spring, and a cam located in the path of movement of said lock mechanism as said main frame rotates, serving to release said lock mechanism and permit the inversion of said bottle-carrying frame.

14. In a bottle-washing machine, the combination of a rotary main frame, an invertible bottle-carrying frame pivotally supported on said main frame, manually operable mechanism for clamping bottles in said bottle-carrying frame, a spring normally tending to invert said bottle-carrying frame from washing position to draining position, a lock mechanism normally holding said bottle-carrying-frame in washing position against the action of said spring, a cam located in the path of movement of said lock mechanism as said main frame rotates, serving to release said lock mechanism and permit the inversion of said bottle-carrying frame, and means for automatically releasing said clamping mechanism during the inverting movement of said bottle-carrying frame.

15. In a bottle washing machine, the combination with a bottle holder, of an injection nozzle adapted to enter the bottle and provided with a flattened free end portion widened toward and closed at its outer end and formed with a discharge orifice in one edge thereof, and a plurality of curved deflector plates between the side walls of said discharge orifice serving to divide the outflowing stream throughout the length of the latter.

16. In a bottle washing machine, the combination with a bottle holder, of an injection nozzle adapted to enter the bottle and provided with a flattened free end portion widened toward and closed at its outer end and formed with a discharge orifice in one edge thereof, and a plurality of curved deflector plates of increasing length outwardly of the nozzle between the side walls of said discharge orifice serving to divide the outflowing stream throughout the length of the latter.

17. In a bottle washing machine, the combination with a bottle holder, of an injection nozzle adapted to enter the bottle and provided with a laterally offset flattened free end portion widened toward and closed at its outer end and formed with a discharge orifice in one edge thereof so disposed as to direct the outflowing stream obliquely against the inner wall of the bottle, and a plurality of curved deflector plates of increasing length outwardly of the nozzle between the side walls of said discharge orifice serving to divide the outflowing stream throughout the length of the latter.

GEORGE B. KEPLINGER.

Witnesses:
SAMUEL N. POND,
DAISY C. THORSEN.